May 30, 1950 P. C. McLEMORE 2,509,691
PLANTER
Original Filed Aug. 17, 1945 5 Sheets-Sheet 1

INVENTOR.
Price C. McLemore
BY
Bnon, Jackson, Boettcher & Dienner.
Attys.

May 30, 1950 P. C. McLEMORE 2,509,691
PLANTER
Original Filed Aug. 17, 1945 5 Sheets-Sheet 5

Inventor:
Price C. McLemore
By Brown, Jackson, Boettcher & Dienner
Attys.

Patented May 30, 1950

2,509,691

UNITED STATES PATENT OFFICE 2,509,691

PLANTER

Price C. McLemore, Waugh, Ala.

Original application August 17, 1945, Serial No. 610,963. Divided and this application August 1, 1947, Serial No. 765,433

10 Claims. (Cl. 111—89)

My present invention relates to an improvement in a planter.

The present application is a division of my copending application Serial No. 610,963, filed August 17, 1945.

In my application above referred to I have disclosed a method of planting an agricultural crop grown from seed in which the field is initially plowed broadcast and left as flat as possible. This step in most climates would generally be done in the fall or early winter season. After such plowing the field is left undisturbed. Most obnoxious vegetation such as the grasses are hardy and usually withstand cold and winter weather so that by planting time they have begun to sprout. In order to destroy such obnoxious or volunteer vegetation it is a further step of my above referred to method to flame the field one or more times during the interval between the time the volunteer vegetation begins to appear and the time for planting. This flaming may be accomplished with the apparatus disclosed in my Patents No. 2,327,204, dated August 17, 1943, or No. 2,369,154 dated February 13, 1945 or any other apparatus suitable for bathing the ground in flames of sufficient intensity and length of time to effect destruction of the growing weeds. The flaming of the ground should be accomplished with the least possible disturbance to the soil so that other weeds are not placed in a position to grow. The number of times flaming is necessary is largely dependent upon the amount of obnoxious vegetation present, the rapidity of its growth and the soil and climate condition. In general it may vary from one to four times. In this manner by the method of my aforesaid application substantially all obnoxious vegetation is removed or destroyed by flaming prior to the time the crop is to be planted. A field thus prepared is ready for planting of the crop seed, and in order not to impair the benefit of the prior flame treatment it is desirable to effect the planting of the crop seeds with the least amount of disturbance to the soil so that a minimum of weed seeds are brought to a zone from which they may germinate.

It is an object of my present invention to provide a planter for planting crop seed in a field by disturbing the soil substantially only in an area necessary to accomplish planting of the crop seed.

In order to accomplish the aforesaid object I propose to provide a planter comprising a vehicle having an endless track type of traction means with which one or more planting units are associated and each of which in the travel of the planter remains stationary with respect to the ground for a given time during movement of the planter. Each of the planting units comprises means for forming a planting hole and for returning the soil removed in forming the planting hole thereto.

A preferred feature of my invention resides in providing a planter as aforesaid having means operable upon formation of the planting hole to deposit a suitable fertilizer in the hole after which a portion of the soil removed in forming the planting hole is returned thereto.

A further preferred feature resides in the provision of means operable after the aforesaid partial return of soil to the planting hole to deposit the crop seed after which the remaining portion of the soil removed in forming the planting hole is returned thereto.

A still further preferred feature resides in the provision of means for effecting tamping the soil returned to the planting hole to restore the capillary action of the soil.

It will be readily understood that in the apparatus of my invention the depositing of fertilizer and initial partial return of soil to the planting hole may be dispensed with in which event the planting hole would only be formed to a depth to provide for the deposit of the crop seed for its proper germination and then return all the soil removed in forming the planting hole with or without tamping of the returned soil as desired.

It will be further understood that the planter of my invention is advantageous for use in methods of planting other than the method above briefly referred to in that in any type of planting it is desirable to disturb only a minimum amount of soil in effecting deposit of seed in the ground.

The above and other objects, features and advantages of my invention will appear from the detail description.

Now in order to acquaint those skilled in the art with the manner of constructing and utilizing a planter in accordance with my present invention, I shall describe in connection with the accompanying drawings a preferred embodiment of my invention.

Figure 1:
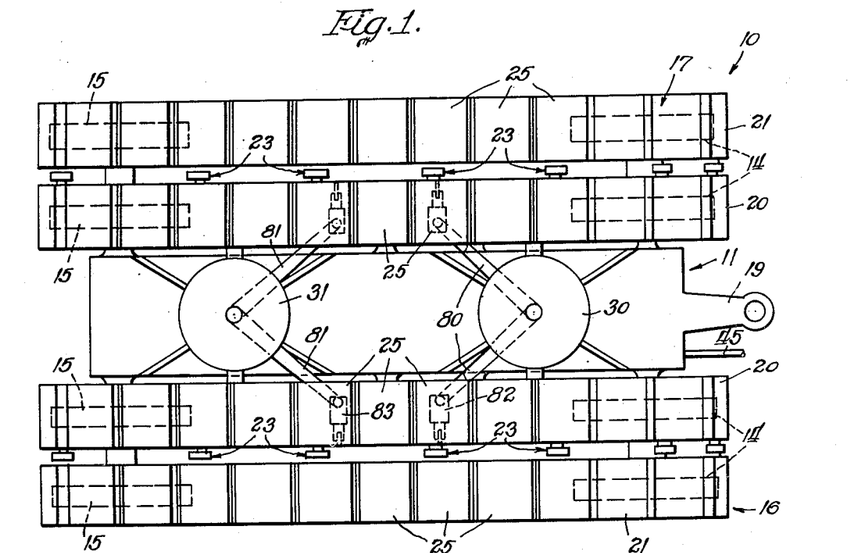
Figure 1 is a plan view of a planter constructed in accordance with my present invention.
Figure 2:
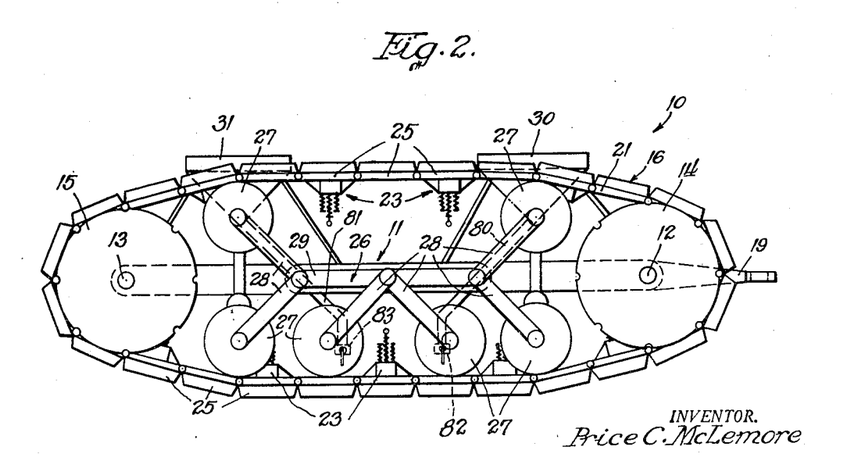
Figure 2 is a side elevational view of the planter shown in Figure 1.

Referring now to Figures 1 and 2 there is shown a planter constructed in accordance with the teachings of my invention for accomplishing planting of cotton seed, or other suitable crop seed, with a minimum of disturbance to the soil. The planter of my invention comprises a vehicle 10 having a main frame 11 which at its forward and rearward ends provides for the support of transversely extending axles or sprocket-supporting shafts 12 and 13, respectively, which have journaled thereon a number of forward and rearward sprockets 14 and 15, respectively, about which endless track means 16 and 17 are trained providing traction means for the vehicle. The forward end of the frame 11 is provided with draw bar member 19 by means of which the vehicle 10 may be hitched to a tractor or otherwise drawn along the ground. As shown more clearly in Figure 1, one each of the endless track means 16 and 17 is disposed at either side of the vehicle 10 and each comprises a pair of laterally spaced inner and outer endless tracks 20 and 21, respectively, with each of the endless tracks 20 and 21 being adapted to be trained over a pair of forward and rearward sprocket wheels 14 and 15 provided therefor. A plurality of planting units 23, shown diagrammatically in Figures 1 and 2, are adapted to be carried by each of the endless track means 16 and 17 at either side of the vehicle and are arranged so that they can effect planting of seed in rows between the spacing of endless tracks 20 and 21 of each of the endless track means 16 and 17 at either side of the vehicle. The endless tracks 20 and 21 of the track means 16 and 17, are of conventional construction and comprise pivotally connected tread members 25 with certain of the tread members 25 each being provided with a planting unit 23. Also, a conventional bogey construction 26 is associated with the vehicle 10 for maintaining the endless track means 16 and 17 taut in the travel of the tracks about the sprockets 14 and 15. This conventional bogey construction comprises a plurality of idler wheels 27 rotatably mounted and suitably supported by links 28 pivotally connected to a frame 29 to support the endless track means 16 and 17 from sagging and to keep the track means in alignment with the sprockets 14 and 15, as is well known in the art. Also, if desired, the planting units 23 may be constructed to connect the endless tracks 20 and 21 together across the spacing between the latter, or other suitable connecting means may be provided for this purpose.

It will be observed that in a vehicle of the type described in connection with Figures 1 and 2 that in the forward travel of the planter, the planting units 23 carried by the treads 25 of the endless track means 16 and 17 will remain stationary with respect to the ground for a predetermined length of time while the vehicle is moving forwardly. As will be hereinafter disclosed in detail it is while the planting units are in their relatively stationary position with respect to the ground that the operations necessary to effect planting of the seed are carried out. An essential feature of my invention is in providing a vehicle whereby a planting unit may remain stationary with respect to the ground for a predetermined length of time to effect planting of seed and not disturb the soil surrounding the immediate planting area, as is the case in prior forms of planters in which there is continuous movement between the planting mechanism and the ground.

While I have shown a single planting unit as extending the full length of tread member 25, it will be understood that the dimensions of the treads and of the planting unit may be proportioned so that the planting unit can be adjusted lengthwise of the endless track means 16 and 17 to provide for different hill spacings of plants. Likewise, the dimensions of the treads may be suitably proportioned and the planting units 23 associated with certain of the treads to provide a desired spacing of the plants in a row. Also the axles or shafts 12 and 13 at the forward and rearward ends of the vehicle preferably are of a sufficient length to permit the axial adjustment thereon of the sprockets 14 and 15 so that the endless track means 16 and 17, together with the planting units 23 carried thereby along opposite sides of the vehicle may be brought closer together or spaced further apart to provide the desired distance between adjacent plant rows. The frame 11 also provides for support of a fertilizer hopper 30 and a seed hopper 31.

It will be understood that the endless track means 16 and 17 each comprising the pair of endless tracks 20 and 21 are of like construction and the description of my invention hereinafter will be limited to the track means 16 and the association of a planting unit 23 therewith, it being further understood that the several planting units 23 are all of the same construction.

Figure 4:
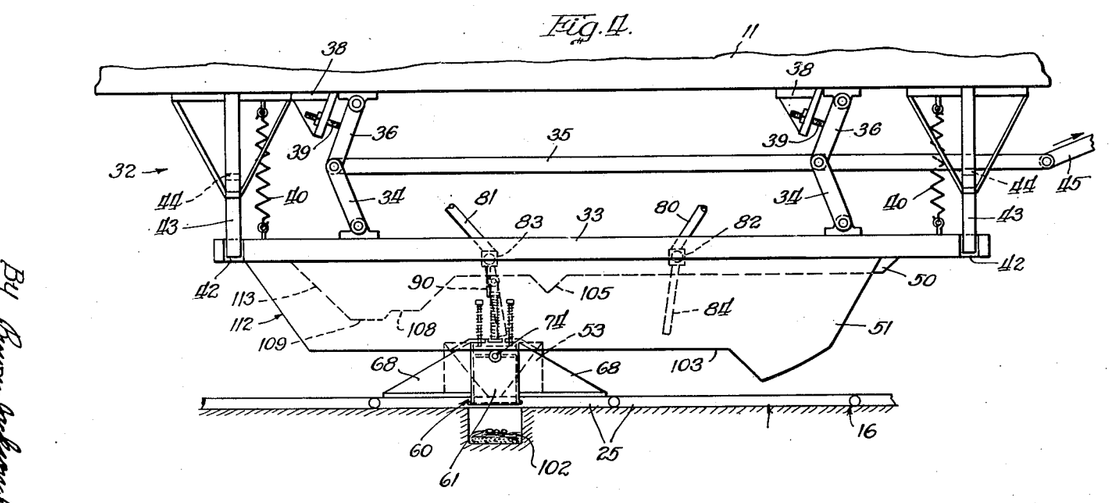
Figure 4 is an enlarged side elevational view of a portion of the planter shown in Figures 1 and 2 and illustrating the arrangement of parts for effecting the sequence of planting operation illustrated in the chart of Figure 3.

Referring now to Figure 4 it will be observed that the frame member 11 provides for support of a planting unit actuating means 32 which comprises a frame member 33 extending lengthwise of the vehicle, which frame member 33 is disposed parallel with and below the frame member 11 between it and the lower run of the endless track means 16. The frame member 33 has a pair of forward and rearward links 34 suitably pivotally mounted in brackets secured thereto and which links at their other ends are pivotally connected to a bar 35 extending lengthwise and forwardly of the vehicle. A second pair of forward and rearward links 36 have pivotal connection to the bar 35 at the pivotal connections of links 34 thereto and the other ends of the links 36 are pivotally connected to brackets fixed to the frame member 11 of the vehicle 10. A pair of brackets 38 are also secured to the frame member 11 and each of the brackets 38 carries an adjustable stop member 39 for engaging the links 36 for limiting rearward rectilinear movement of bar 35. A pair of coil springs 40 are suitably connected at their opposite ends to the frame member 33 and the frame member 11 to normally urge the frame member 33 toward the frame member 11. The frame member 33 at its forward and rearward ends is provided with a pair of slots 42 into which guide arms 43 carried by the frame member 11 extend for guiding movement of the frame member 33 vertically relatively of the vehicle. The guide bars 43 are provided with stops 44 for limiting the upward movement of the frame member 33 by the springs 40. The forward end of the bar 35 has a handle or actuating member 45 pivotally connected thereto which extends forwardly of the vehicle. Upon the bar 35 being urged to the right by means of grasping the actuating member 45 in the position of the parts shown in Figure 4, the common pivotal axes of the links 34 and 36 upon the draw bar 35 will be drawn past center after which the springs 40 will be effective to raise the frame member 33 vertically upwardly to a position in which the stops 44 are engaged, which position of the frame member 33 as will be hereinafter described positions the planter actuating mechanism in its inoperative position so that the vehicle may be drawn or moved without actuation of the planting units 23. As shown in Figure 4, the frame member 33 has suitably secured to the under surface thereof a pair of lengthwise extending cam plate members 50 and 51, the functions and purposes of which will be described in detail hereinafter.

Figure 6:
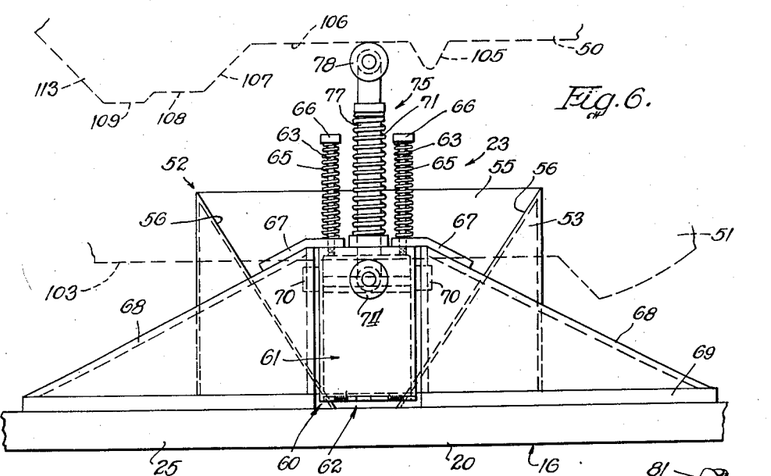
Figure 6 is an enlarged side elevational view of a planting unit of my invention and illustrating in dotted lines portions of cam means provided to actuate the planting unit.
Figure 7:
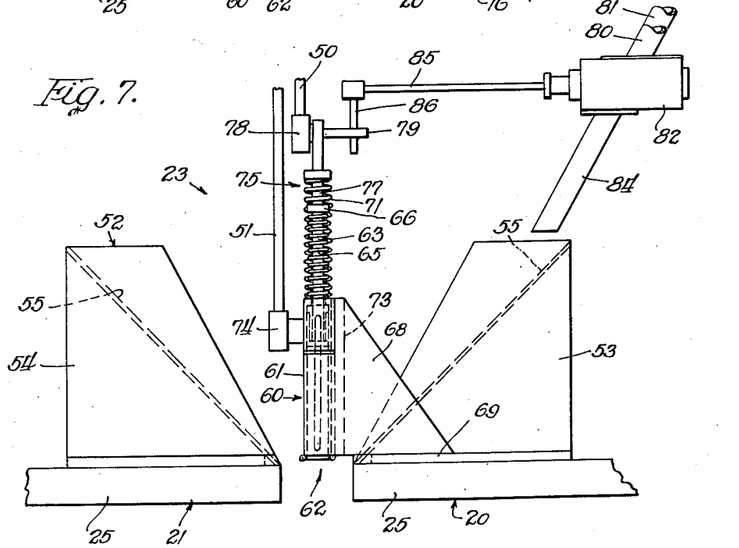
Figure 7 is an end elevational view of the planting unit shown in Figure 6.
Figure 8:
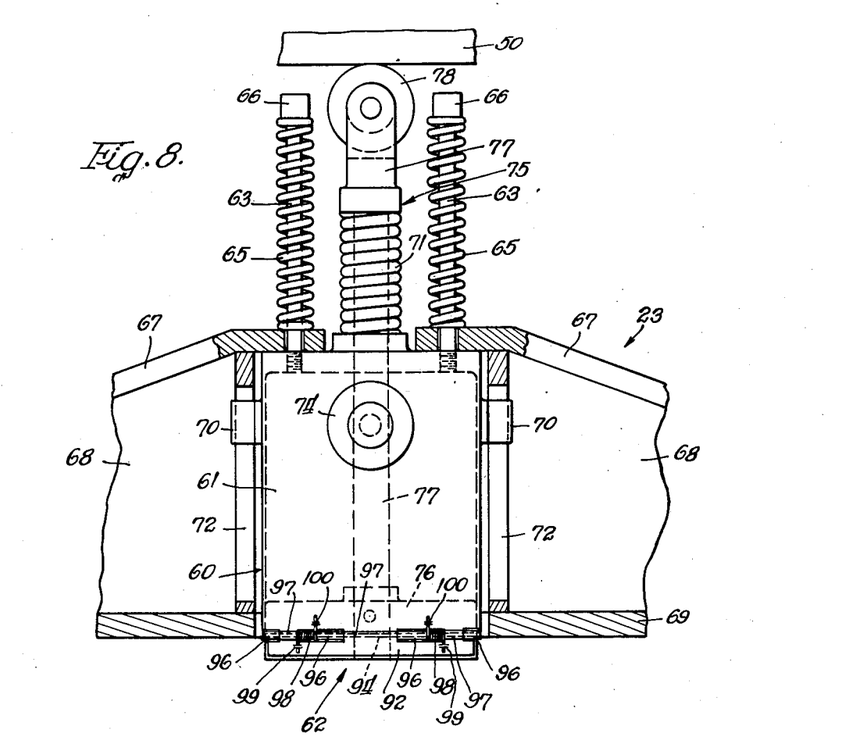
Figure 8 is an enlarged side elevational view of the planting hole forming means and plunger means of the planting unit of Figure 7.
Figure 9:
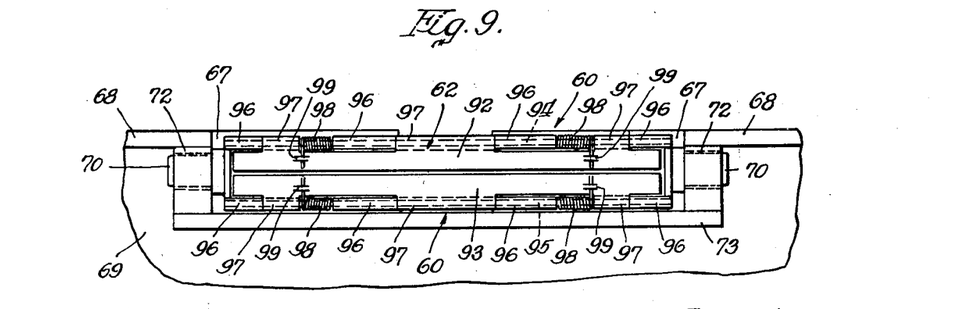
Figure 9 is a bottom view of that part of the apparatus shown in Figure 8.

Reference may now be had to Figures 4, 6 and 7 from which it will be seen that the planting unit 23 comprises a funnel means 52 for guiding fertilizer and crop seed into a planting hole to be formed between the spacing of endless tracks 20 and 21, which is formed by a pair of semi-funnel members 53 and 54 carried, respectively, by opposed tread members 25 of the endless tracks 20 and 21 of the endless track means 16 in opposed relation with respect to each other. The semi-funnel members 53 and 54 are of like construction and are preferably made of sheet metal and each comprises an inclined wall 55 extending diagonally downwardly and inwardly from the upper outer edges thereof to the spacing between the endless tracks 20 and 21, and a pair of end walls 56 extending diagonally downwardly and centrally toward each other from the upper end edges of these members. A planting hole forming means is indicated generally at 60 and comprises a vertically reciprocal shovel or hole digging member 61 which for the planting of cotton seed is preferably approximately 4½" in length and ½" in width. The shovel 61 is provided with a valve means 62 at its lower end, which valve means will be described in detail hereinafter. A pair of vertically extending rods 63 are threaded at their inner ends into the upper closed end of shovel member 61. Coil springs 65 are confined between enlarged heads 66 at the upper ends of the rods 63 and a pair of flange members 67 carried by the pair of spaced shovel supporting frame members 68 to receive therebetween the shovel 61, which shovel supporting frame members 68 are provided with laterally inwardly extending flanges 69 which are suitably secured to the track tread 25 of the inner endless track 20 of the track means 16. The frame members 68 provide for support of the planting hole forming means 60 above the space between the pair of spaced endless tracks 20 and 21. The coil springs 65 normally provide for positioning of the shovel 61 in the position shown in Figures 6 and 7 wherein it is spaced above the ground. The shovel 61 is provided with a pair of ears 70 which as shown more clearly in Figures 8 and 9 provide for guiding of the shovel in its vertical movement by vertically extending guide slots formed in vertical frame members 72 disposed along the vertical end edges of shovel 61 and secured between frame members 68 and backing panel 73. A shovel cam follower 74 is suitably supported adjacent the upper end of the shovel 61 and is adapted to be engaged by the shovel control cam 51 for effecting vertical reciprocal movement of the planting hole forming means 60. A plunger means 75 is mounted for vertical reciprocal movement in the shovel housing 61 and comprises an end plate member or piston 76 suitably secured to the lower end of a vertically extending rod 77 which at its upper end provides for support of a plunger cam follower 78 which is adapted to have engagement with the cam surfaces of the plunger operating cam 50. A coil spring 71 is disposed about rod 77 and normally provides for positioning of the plunger means 75 in its uppermost position in which the piston 76 is positioned at the upper end of shovel 61. A pin 79 carried by rod 77 extends laterally inwardly of the endless track 20 and serves as a trip arm for causing delivery of fertilizer and crop seed to the funnel means 52 of a planting unit 23. Referring again now to Figures 1, 2 and 4, it will be observed that flexible conduits 80 and 81 extend from the fertilizer hopper 30 and the seed hopper 31, respectively, to dispenser devices 82 and 83, respectively. The dispenser devices 82 and 83 are of known construction and when tripped are adapted to deliver a predetermined measured amount of fertilizer and seed, respectively. As shown more clearly in Figure 7, the fertilizer dispenser 82 has a discharge conduit 84 extending therefrom, which is adapted to discharge the fertilizer into funnel member 53. A shaft 85 extends laterally outwardly of the dispenser 82 and at its end is formed with a trip arm 86 which when tripped by the pin 79 carried at the upper end of the rod 77 actuates the fertilizer dispenser means 82 to effect discharge of fertilizer from the fertilizer hopper 30 through the discharge conduit 84 and into the funnel member 53 of planting unit 23. The seed dispenser unit 83, like the fertilizer dispenser unit 82, is provided with a trip arm 90 adapted to be engaged by the pin 79 at the upper end of rod 77 to discharge seed into funnel member 53 of the funnel means 52 of a planting unit 23.

Reference may now be had particularly to Figures 8 and 9 for a description of the valve means 62 at the lower end of the shovel housing 61 of the planting hole forming means 60 of my invention. It will be observed that valve means 62 comprises a pair of plate valve members 92 and 93 pivotally mounted along their outer side edges about a pair of pins 94 and 95, respectively, which are supported in spaced bearing supports 96 formed integrally of the side walls of the shovel at their lower ends. Each of the valve members 92 and 93 is also formed with spaced bearing supports 97 fitting about pins 94 and 95 between the bearing elements 96 of the side walls of shovel 61, and a pair of coil springs 98 for each valve plate are disposed about the pins 94 and 95, respectively, between certain of the spaced bearing supports 96 and 97 of the shovel and valve plates. One of the ends of each of the coil springs is secured to the valve plate members 92 and 93 in clips 99 formed by spaced slits in the valve plates, and the other ends of the springs are fixed in clips 100 suitably formed by spaced slits in the side walls of the shovel 61. The arrangement of the springs is such that they normally maintain the valve plates 92 and 93 in horizontal position, but provide for swinging thereof inwardly and outwardly of the shovel 61, to provide for the admission of soil into the shovel housing 61, and for the discharge of soil therefrom as will more fully appear hereinafter in describing the mode of operation of my planter.

Figure 3:
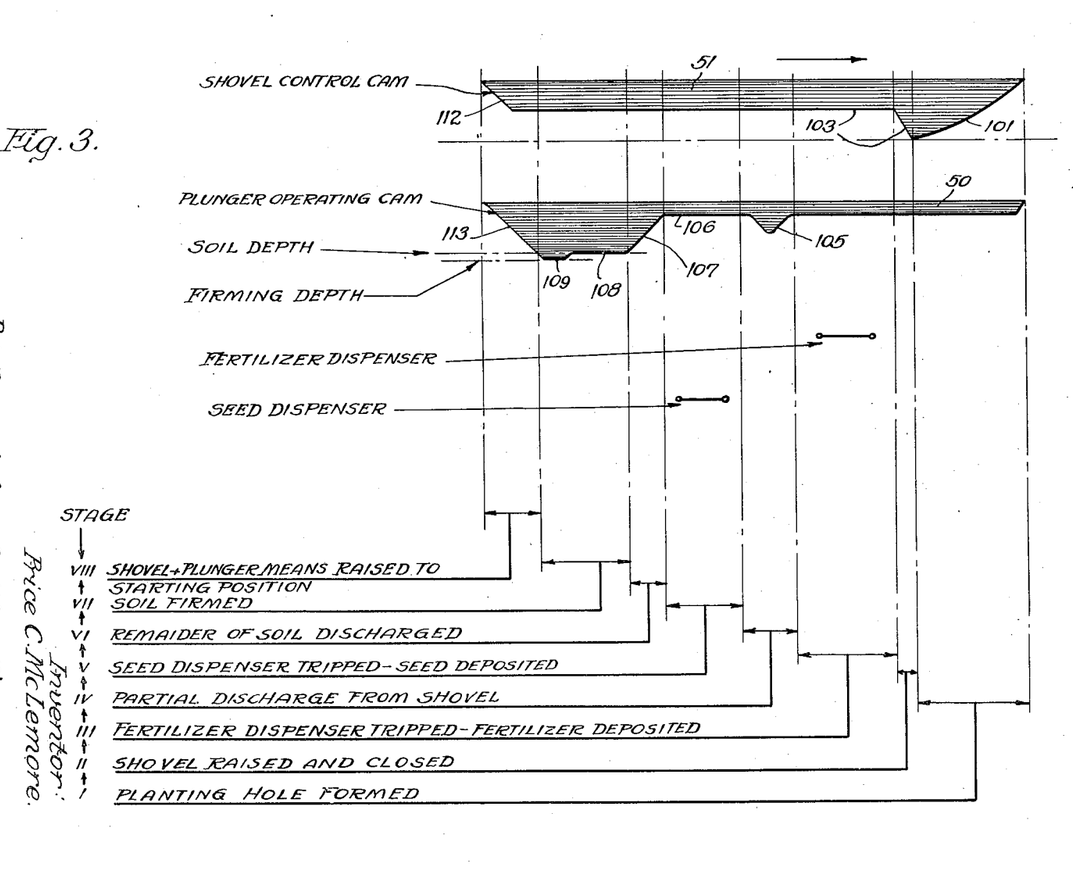
Figure 3 is a chart showing the sequence of planting operations of the planter shown in Figures 1 and 2.
Figure 5:
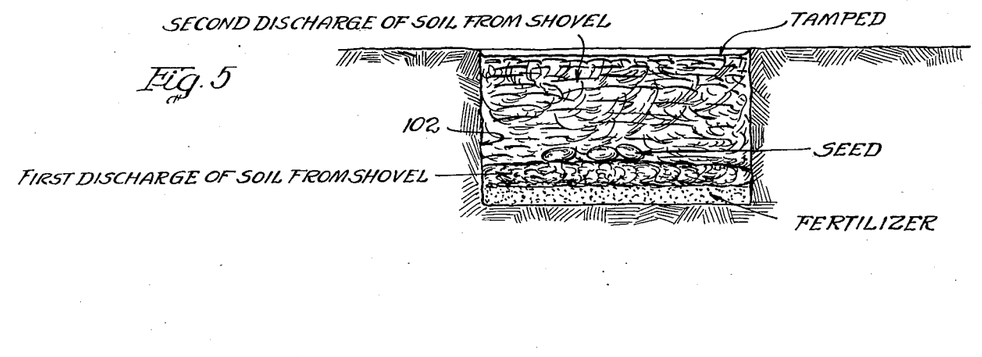
Figure 5 is a vertical cross sectional view through a completed seed bed provided by the apparatus of my invention.

For purposes of explaining the operation of the planter of my present invention reference may now be had particularly to Figures 3, 4, and 5. After the planter has been brought to the field and it is desired to effect planting of seed, the handle member 45 is urged to the left, as viewed in Figure 4, to effect movement to the left of the bar member 35 to position the planter unit actuating mechanism 32 in the position shown in Figure 4. With the planter unit actuating mechanism 32 in this position it will be observed that as a planting unit 23 assumes a stationary position relative to the ground and during forward movement of the vehicle that the plunger operating cam 50 and the shovel control cam 51 will engage the cam follower 78 of the plunger actuating means 75, and the cam follower 74 of the planting hole forming means 60, respectively. Thus in stage I, indicated in Figure 3, the cam surface 101 of the shovel control cam 51 engages the cam follower 74 of the planting hole forming means 60 which drives the shovel 61 into the ground and forms the planting hole 102. During this downward vertical movement of the shovel 61, the plate valve members 92 and 93 pivot inwardly of the shovel housing to admit the soil to be removed in forming the planting hole, and after the cam follower 74 passes the high point of the cam surface 101 it comes into engagement with the cam surface 103 enabling the pair of coil springs 65 to raise the planting hole forming means 60 above the surface of the ground to the position shown in Figure 4. This raising of the shovel 61 is indicated as stage II in the chart of Figure 3. As the shovel 61 is being raised from the planting hole 102 the valve plates 92 and 93 are caused to return to their normal horizontal position by tension created in springs 98 by the pivoting inwardly of the valve plates to close the bottom of the shovel and retain therein the soil removed in forming the planting hole. Now, as the vehicle 10 proceeds to move forwardly the pin 79 carried at the upper end of the plunger rod 77 engages the trip arm 86 causing rotation of the shaft 85 to effect actuation of the fertilizer dispenser 82 to discharge fertilizer through conduit 84 into the funnel means 52 of the planting unit 23 which is caused by the latter to be discharged into the planting hole 102, as illustrated by stage III in Figure 3. Now, as the vehicle proceeds to move forwardly the cam surface 105 of the plunger operating cam 50 is caused to engage the plunger cam follower 78 carried at the upper end of the plunger rod 77 to effect a first stage partial discharge of soil in the shovel 61 into the planting hole 102 and on top of the fertilizer as indicated by stage IV. After the high point of cam surface 105 passes the cam follower 78 it returns to the original position in engagement with the cam surface 106 of the plunger operating cam 50. The downward movement of the rod 77 causes the end plate or piston 76 of the plunger means to force soil in the shovel 61 outwardly through the valve plates 92 and 93 at the lower end thereof. The spring 71 carried by the cam plunger rod 77 returns the plunger rod 77 and piston 76 to the upper position in the shovel 61 and the coil springs 98, which have been tensioned by the outward pivotal movement of the valve plates 92 and 93, again return the latter to their normal horizontal position to retain the remainder of the soil in the shovel removed in forming the planting hole 102. Thereafter, as indicated by stage V, the pin 79 carried at the upper end of the plunger arm 77 engages the trip arm 90 of the seed dispenser mechanism 83 providing for discharge of seed from the seed hopper 31 into the funnel means 52 of the planting unit 23 to effect deposit of seed in the planting hole. Then in the continued forward movement of the vehicle the cam follower 78 is engaged by the cam surface 107 of the plunger operating cam 50 to effect the stage VI of the planting operation, which engagement of the cam surface 107 with the follower 78 causes movement of the piston 76 substantially entirely through the shovel 61 to discharge the remainder of the soil into planting hole 102 removed in forming the same. Thereafter in the continued movement of the vehicle the cam surfaces 108 and 109 successively engage the cam follower 78, as illustrated by stage VII, to first position the piston 76 at the end of the rod 77 substantially even with the edges of the opened valve plates 92 and 93 to firm the soil returned to the planting hole at substantially the level of the ground, with the cam portion 109 being effective for projecting the piston 76 at the end of rod 77 beyond the edges of the outturned valve plates 92 and 93 to firmly pack or tamp the soil returned to the planting hole, preferably an amount so that the upper surface of the planting hole is slightly below the level of the ground as shown in Figure 5 of the drawings. After the above sequence of operations have been effected by the several cam surfaces of the shovel control arm 51, and the plunger operating cam 50, the cam followers 78 and 74 follow the cam portions 112 and 113 of the cams 51 and 50, respectively, to return the planting hole forming means 60 and plunger means 75 to their initial positions. This is indicated at stage VIII of Figure 3. After the planting unit 23, shown in Figure 4, has been actuated through the several stages described above it approaches the rearmost sprocket 15 and again travels thereabout in the forward movement of the vehicle. However, since several planting units 23 are associated with the endless track means 16 and 17, it will be observed that the planting unit actuating means 32 is effective to successively actuate the planting units while the latter are in stationary position relative to the ground and during forward movement of the vehicle.

It will be observed that if desired the outer track sections 21 of the endless track means 16 and 17, together with the funnel members 54 carried thereby and the sprockets 14 and 15 provided therefor, may be dispensed with if desired in which case the funnel members 53 of each of the planting units 23 would provide for guiding fertilizer and seed into the planting holes.

While I have shown what I consider to be the preferred embodiment of my invention it will be understood that various modifications and rearrangements may be made therein without departing from the spirit and scope of my invention.

I claim:

1. In a planter for planting crop seeds, the combination of a vehicle having endless track means providing for movement thereof along the ground, a planting unit associated with said endless track means whereby said unit is adapted to remain stationary relative to the ground for a predetermined length of time during movement of the vehicle, said planting unit including means for removing soil from the ground to form a planting hole and to return subsequently the removed soil into the planting hole, and means carried by said vehicle operable to effect actuation of said last named means when said planting unit is in its aforesaid stationary position and during movement of said vehicle.

2. In a planter for planting seed the combination of a vehicle having endless track means providing for movement thereof along the ground, a planting unit associated with said endless track means whereby said unit is adapted to remain stationary relative to the ground for a predetermined length of time during movement of the vehicle, said planting unit comprising means for removing soil from the ground to form a planting hole and return the removed soil into the planting hole, means carried by said vehicle operable to effect actuation of said means of said planting unit when the latter is in its aforesaid stationary position and during movement of said vehicle, and seed dispensing means carried by said vehicle for dispensing seed into said planting hole, said seed dispensing means being adapted to be actuated by said planting unit after said planting hole has been formed.

3. In a planter, the combination of a vehicle having endless track means providing for movement thereof along the ground, a planting unit associated with said endless track means whereby said unit is adapted to remain stationary relative to the ground for a predetermined length of time during movement of the vehicle, said planting unit comprising means for forming a planting hole by removing soil from the ground and return subsequently the removed soil in two stages into the planting hole, means carried by said vehicle operable to effect actuation of said means of said planting unit when the latter is in its aforesaid stationary position and during movement of said vehicle, fertilizer dispensing means carried by said vehicle, seed dispensing means carried by said vehicle, said fertilizer dispensing means being adapted to be actuated by said planting unit after formation of said planting hole to effect deposit of fertilizer therein, and said seed dispenser means being adapted to be actuated by said planting unit after the first stage return of the soil to said planting hole removed in forming the latter.

4. In a planter, the combination of a vehicle having endless track means providing for movement thereof along the ground, a planting unit associated with said endless track means whereby said unit is adapted to remain stationary relative to the ground for a predetermined length of time during movement of the vehicle, said unit comprising a vertically reciprocable planting hole forming means, plunger means mounted for vertical movement in said planting hole forming means, first cam means carried by said vehicle adapted to engage said planting hole forming means when said unit is stationary relative to the ground to form a planting hole in the ground, said planting hole forming means including means for retaining therein the soil removed in forming the planting hole, and second cam means carried by said vehicle for actuating said plunger means to discharge the soil from said planting hole forming means into the planting hole while the planting unit is in its stationary position.

5. The combination of claim 4 characterized by the vehicle carrying seed dispensing means for depositing seed in the planting hole formed by the planting hole forming means, said seed dispensing means having a trip arm positioned to engage trip means carried by said planting unit with the latter in its stationery position to effect actuation of said seed dispenser means after formation of said planting hole.

6. In a planter, the combination of a vehicle having endless track means providing for movement thereof along the ground, a planting unit associated with said endless track means whereby said unit is adapted to remain stationary relative to the ground for a predetermined length of time during movement of the vehicle, said unit comprising a vertically reciprocable planting hole forming means, plunger means mounted for vertical reciprocable movement in said planting hole forming means, first cam means carried by said vehicle adapted to engage said planting hole forming means when said unit is stationary relative to the ground to form a planting hole in the ground, said planting hole forming means including means for retaining the soil removed therein in forming the planting hole, second cam means carried by said vehicle for actuating said plunger means to return the soil retained in said planting hole forming means in two stages to said planting hole, fertilizer dispensing means carried by said vehicle for depositing fertilizer in the planting hole, seed dispenser means carried by said vehicle for depositing seed in the planting hole, trip means carried by said planting unit for effecting actuation of said fertilizer dispensing means after formation of the planting hole by said planting hole forming means, and said trip means being effective to trip said seed dispensing means subsequent to actuation of said plunger means by said second cam means to effect the first stage return of soil to said planting hole to deposit seed therein, and said second cam means after deposit of said seed being adapted to actuate said plunger means to effect the second stage return of soil to said planting hole.

7. In a planter, the combination of a vehicle having endless track means providing for movement thereof along the ground, a planting unit associated with said endless track means whereby said unit is adapted to remain stationary relative to the ground for a predetermined length of time during movement of the vehicle, said unit comprising a vertically reciprocable planting hole forming means, plunger means mounted for vertical reciprocable movement in said planting hole forming means, first cam means carried by said vehicle adapted to engage said planting hole forming means when said unit is stationary relative to the ground to form a planting hole in the ground, said planting hole forming means including means for retaining therein soil removed in forming the planting hole, second cam means carried by said vehicle for actuating said plunger means to return the soil in said planting hole forming means in two stages to said planting hole, fertilizer dispensing means carried by said vehicle for depositing fertilizer in the planting hole, seed dispenser means carried by said vehicle for depositing seed in the planting hole, trip means carried by said planting unit for effecting actuation of said fertilizer dispensing means after formation of the planting hole by said planting hole forming means, and said trip means being effective to trip said seed dispensing means subsequent to actuation of said plunger means by said second cam means to effect the first stage return of soil to said planting hole to deposit seed therein, and said second cam means after deposit of said seed being adapted to actuate said plunger means to effect the second stage return of soil to said planting hole, and said second cam having a portion for actuating said plunger means to tamp the soil returned to said planting hole.

8. In a planter, the combination of a vehicle having endless track means providing for movement thereof along the ground, a planting unit carried by said endless track means whereby said unit is adapted to remain stationary relative to the ground for a predetermined length of time during movement of the vehicle, said unit comprising, planting hole forming means for forming a planting hole in the ground and including valve means to retain the soil removed in forming the planting hole, and discharge means for discharging the soil from said planting hole forming means, first cam means carried by said vehicle adapted to actuate said planting hole forming means when said unit is stationary relative to the ground and during movement of said vehicle to form a planting hole, and second cam means carried by said vehicle for actuating said discharge means to discharge the soil from said planting hole forming means into the planting hole while said planting unit is in its stationary position.

9. In a planter, the combination of a vehicle having endless track means providing for movement thereof along the ground, a planting unit carried by said endless track means whereby said unit is adapted to remain stationary relative to the ground for a predetermined length of time during movement of the vehicle, said unit comprising, planting hole forming means for forming a planting hole in the ground, valve means for retaining the soil removed in forming the planting hole in said planting hole forming means, and discharge means for discharging the soil from said planting hole forming means through said valve means, first cam means carried by said vehicle adapted to actuate said planting hole forming means when said unit is stationary relative to the ground and during movement of said vehicle to form a planting hole, and second cam means carried by said vehicle for actuating said discharge means to discharge the soil from said planting hole forming means into the planting hole while said planting unit is in its stationary position, said second cam means having a portion for actuating said discharge means to tamp the soil returned to said planting hole.

10. The combination of claim 8 characterized by the vehicle carrying seed dispensing means, and means between said seed dispensing means and said planting unit for actuating said seed dispensing means after formation of said planting hole and before return of the soil removed in formation of the same by said discharge means.

PRICE C. McLEMORE.

REFERENCES CITED

The following references are of record in the file of this patent:

UNITED STATES PATENTS

| Number | Name | Date |
|---|---|---|
| 859,536 | Albert | July 9, 1907 |
| 1,362,569 | Grzybowski | Dec. 14, 1920 |
| 2,050,739 | Sieverkopp | Aug. 11, 1936 |